United States Patent [19]

Tucker et al.

[11] 3,981,713

[45] Sept. 21, 1976

[54] UREA-ZINC OXIDE COMPOSITION AND PROCESS

[75] Inventors: Gerald L. Tucker; Elmer Ladelle Blanton, both of Yazoo City, Miss.

[73] Assignee: Mississippi Chemical Corporation, Yazoo City, Miss.

[22] Filed: July 23, 1971

[21] Appl. No.: 165,698

[52] U.S. Cl. .................................... 71/28; 71/64 F; 71/64 G; 71/64 DB; 260/555 C
[51] Int. Cl.² ................... C05C 9/00; C07C 126/00
[58] Field of Search ......................... 71/1, 28–30, 71/64 E, 64 G, 64 DB; 260/555 C

[56] References Cited
UNITED STATES PATENTS

| | | | |
|---|---|---|---|
| 2,958,594 | 11/1960 | Halper | 71/28 X |
| 3,130,225 | 5/1964 | Friend | 71/64 DB |
| 3,180,735 | 4/1965 | Titus | 99/2 ND |
| 3,379,496 | 4/1968 | Russo | 71/64 DB |
| 3,457,336 | 7/1969 | Harris | 71/64 DB X |
| 3,520,651 | 7/1970 | Philen et al. | 71/1 X |
| 3,533,776 | 10/1970 | Coates et al. | 71/28 |
| 3,558,299 | 1/1971 | Baskin | 71/64 DB |

*Primary Examiner*—Charles N. Hart
*Assistant Examiner*—Ferris H. Lander
*Attorney, Agent, or Firm*—Oblon, Fisher, Spivak, McClelland & Maier

[57] ABSTRACT

A particulate fertilizer comprising urea particles having a fertilizing quantity of available zinc in the form of zinc oxide which is homogeneously dispersed throughout the urea particles. The urea-zinc oxide particles may be prepared by dissolving zinc oxide into molten urea containing less than 12% by weight water, based on water/urea + water, and solidifying the molten urea-zinc oxide blend into particles of any desired form.

10 Claims, No Drawings

UREA-ZINC OXIDE COMPOSITION AND PROCESS

BACKGROUND OF THE INVENTION

1. Field of the Invention

This invention relates to urea-zinc oxide fertilizer compositions and methods of preparing them. More particularly, this invention relates to urea-zinc oxide particles having zinc oxide homogeneously dispersed throughout the urea particles and to a process of preparing such particles.

2. Description of the Prior Art

Urea is widely used in many fertilizer applications as a source of nitrogen. In many instances, it is the preferred nitrogen source, since it contains a higher percentage of nitrogen as compared with many other available nitrogen-containing materials. Furthermore, urea may be made into a variety of particulate forms, such as granules, crystals, or prills, which are convenient to handle.

Zinc has been used with a variety of fertilizer compositions as a desirable trace element. However, in many applications, especially for the growth of rice, corn or the like, zinc is often used in relatively large amounts on the order of 8%. Heretofore, however, no suitable method has been devised for incorporating such relatively large amounts of zinc into urea fertilizers. In the past, zinc compounds have generally been applied as a separate step in fertilizing a field, which, of course, is highly undesirable from the labor standpoint.

Prior art methods for adding zinc salts to fertilizer compositions for one-step application included dry blending, coating, and solution dispersion methods. Two major disadvantages detract from all of these methods, viz., hygroscopicity and the difficulty of obtaining a uniform product.

Dry blending of zinc salts with particulate fertilizer compositions is generally unsatisfactory, since combinations of zinc salts and urea are usually hygroscopic and thus absorb moisture from the air and agglomerate into an unusable solid cake. Furthermore, powdery zinc compounds readily separate from the particulate material, resulting a waste of zinc, often interfering with the proper operation of fertilizer dispensing machinery, and causing nonuniform application to crops.

In one attempt to overcome such disadvantages, several prior art methods of coating zinc compounds on particulate fertilizer compositions have been described. However, the inherent highly hygroscopic properties of the zinc salts still cause problems, since particulate fertilizer compositions coated with these zinc salts tend to absorb moisture from the air and agglomerate into an unusable solid cake. Attempts to slow the rate of water absorption by the use of a clay binder or other exterior coating have not been sufficient to counteract the increased rate of water absorption. Furthermore, it is extremely difficult to obtain uniform coating of zinc salts on urea. The presence of an uneven coating results in exposed areas which provide sites for the urea particles to cake or stick together, and the zinc compounds tend to powder off from the urea particles, forming a zinc powder separate from the particulate material to be applied. Thus, the disadvantages of the dry blending technique are not overcome in a wholly satisfactory manner. A further disadvantage of prior art coating processes is the wide variation in results which are obtained from zinc compounds purchased from different manufacturing sources.

Dispersion methods for adding zinc compounds to particulate fertilizers also pose problems due to the hygroscopic properties of the zinc additives. These properties are particularly troublesome in causing dissolution and/or caking of free-flowing, particulate urea compositions; since urea must have a low water content to remain free-flowing and have good storage characteristics. This level of dryness is difficult to achieve after highly hygroscopic, water-soluble zinc salts such as zinc sulfate, zinc nitrate, and zinc chloride have been added to a urea melt.

While initially it had been thought that water-soluble zinc salts had to be used in urea fertilizers, recent reports have demonstrated that water-insoluble zinc compounds are satisfactory for many applications. Accordingly, it was thought to add certain water-insoluble zinc salts to urea, but these salts tended to be difficult to disperse, resulting in an uneven distribution and uneven release of zinc into the soil.

Those concerned with the development of solid, particulate, zinc-containing fertilizer compositions have long desired a particulate urea-zinc fertilizer which could be handled in the same manner as particulate urea fertilizers. Furthermore, it would be highly desirable if such particulate fertilizers could be prepared by a relatively simple process which did not involve coating the zinc material onto the urea particles and did not significantly increase the hygroscopicity of the resultant product. The present invention fills such needs.

SUMMARY OF THE INVENTION

Accordingly, one object of the present invention is to provide a particulate urea-zinc fertilizer.

Another object of the present invention is to provide a simple process for preparing particulate urea-zinc fertilizer compositions.

A further object of the present invention is to provide a particulate urea-zinc fertilizer wherein the zinc is homogeneously dispersed throughout the urea particles.

Yet another object of the present invention is to provide a process for producing urea-zinc fertilizers which may be granulated or prilled.

A still further object of the present invention is to provide urea-zinc fertilizer particles which may be handled in the same manner as conventional urea particles.

These and other objects are attained in one aspect of the present invention which provides a particulate fertilizer comprising urea particles having a fertilizer quantity of available zinc in the form of zinc oxide homogeneously dispersed throughout said urea particles. The urea-zinc oxide particles may be prepared by dissolving zinc oxide into molten urea containing less than 12% by weight water (based on the total weight of the composition), preferably less than 0.3% water, and solidifying the molten urea-zinc oxide blend into particles of any desired form.

These and other objects, features and advantages of the invention will become more fully apparent to those skilled in the art from the following description and examples of preferred embodiments of the invention, which are presented by way of example and not by way of limitation.

DESCRIPTION OF PREFERRED EMBODIMENTS

In accordance with the present invention, molten urea is concentrated to a moisture content of less than 12% by weight, preferably less than 0.3% by weight.

Zinc oxide is then dissolved into the molten urea, and the blended mixture then solidified into particles of any desired form. The particles obtained by such a process comprise urea having zinc oxide homogeneously dispersed therethrough, and may be handled by any conventional method for handling urea particles.

It is important that the water content of the urea be reduced to less than 12% by weight prior to the addition of zinc oxide thereto, since zinc oxide will not dissolve to any appreciable extent in a urea melt which contains more than 12% water. The water content of the urea may be reduced by any convenient method, as is well known in the art. If the urea-zinc oxide blend is to be granulated, a water content of less than 12% by weight is satisfactory at this stage, but subsequent drying of the granules will be necessary to provide good storage characteristics. If the urea-zinc oxide blend is intended to be prilled, the urea melt may be concentrated to a water content of less than 0.3% by weight before adding the zinc oxide. This will save an additional drying step after prilling and prevent any evaporator fouling caused by the presence of zinc oxide in the melt being concentrated.

One of the distinct advantages of this invention is that, although zinc oxide is insoluble in water, it is quite soluble in urea, having a relatively high maximum solubility of 27.5% in urea. This high degree of solubility permits the easy dispersion of almost any fertilizing amount of zinc oxide uniformly and homogeneously into the urea. Zinc oxide, while soluble in molten urea, remains water-insoluble. Because of the low solubility of many other zinc salts in urea, a true solution cannot be obtained at the desirable 6% zinc level. Of course, higher percentages, such as up to 80% zinc oxide, may also be used if desired, but it is quite rare that such high concentrations of zinc oxide would be required in fertilizer formulations. Furthermore, that amount of zinc oxide in excess of 27.5% will not be dissolved in the urea, but will be present in insoluble form.

The internal blends of the present invention are easy to prepare. Molten urea, either from a reaction producing urea or prepared by melting solid urea, is maintained in the molten state at a temperature above the freezing point of the desired urea-zinc oxide blend. 88% urea melts at 220°F., and it will generally be preferable to maintain the temperature of the molten urea between 220° and 305°F., preferably between 280° and 300°F., and most desirably between 280°–290°F. to facilitate solubility of zinc oxide in the melt. Pressures are not critical, and atmospheric pressure will generally be most convenient.

The zinc oxide may be added in any convenient form, generally as a dry powder. Unlike prior art methods attempting to prepare high zinc content urea particles, variations from batch to batch of zinc oxide samples obtained from different sources are essentially eliminated in the process of the present invention. While, as previously indicated, any desired amount of zinc oxide may be added to the urea melt, for most fertilizer applications it will be preferred to add less than 27.5% by weight zinc oxide, so as not to exceed the solubility of zinc oxide in the urea melt. Preferably, zinc oxide will be added in an amount of from 1 to 15%, and especially preferred compositions are obtained by adding 8% zinc oxide. The latter formulation gives a fertilizer containing 6% by weight zinc, which is highly suitable for certain crops. Since zinc oxide contains a high percentage of available zinc, the total amount to be added may be less than that which would be required using other zinc compounds.

The only criticality in obtaining the desired blend is that the water content of the molten urea must remain below 12%, and that the temperature of the molten urea must be high enough so that the addition of zinc oxide does not solidify the mixture. Typically, urea when prepared will have up to 18% water, which can be reduced to less than 12% by any suitable means. If prills are to be formed, it will be advantageous to dry the urea to the required water content of less than 0.3% at this time prior to adding the zinc oxide to the melt.

Zinc oxide has a marked effect on the freezing point of the urea, which may slightly modify prilling conditions to be used in subsequent treatment. For example, the freezing point of a urea sample containing no added zinc oxide was 265°F; addition of 5% zinc oxide lowered this to 260°F.; 10% zinc oxide lowered it to 244°F.; and 15% zinc oxide lowered this to 238°F. By decreasing the air rate in the prilling tower and adjusting the prilling equipment, prills of these lower freezing point compositions may be prepared using existing equipment.

The desired amount of zinc oxide, in any convenient form, is added to the molten urea having less than 12%, and preferably 0.3% or less water, and homogeneously mixed in the melt. If desired, the materials may be dry blended prior to melting, but it is preferable to add zinc oxide to molten urea having less than 12% water, preferably less than 0.3% water. Zinc oxide will not dissolve to any appreciable extent in a urea melt which contains more than 12% water.

Prills of typical size (i.e., 0.1 to 2.5 mm. diameter, with an average diameter of about 1.5 mm.) are easily obtained from the compositions prepared in accordance with this invention. Prills containing higher amounts of zinc oxide as an internal additive are somewhat softer than normal urea prills. If desired, granular or pelletized urea-zinc oxide particles can also be formed. The particulate urea-zinc oxide products of the present invention are less hygroscopic than those obtained with other zinc sources, but are more hygroscopic than urea alone. They may be granular or hollow, and may be further treated by processes known in the art, such as by coating, adding conditioning or anti-caking agents, or other known treatments used for granular or prilled urea.

While not wishing to be bound by any theory of this invention, it appears that some complexing takes place between the zinc oxide and the urea, as suggested by the fact that the addition of a measured amount of zinc oxide according to the process of the present invention, unlike dry blends or mixed solutions of urea and zinc oxide, results in a product containing less water insoluble material than would be expected.

If desired, other salts may be added in the molten phase together with the zinc oxide. If additional compounds are added, they may mutually affect the solubility of each other in the urea. For example, ammonium sulfate lowers the solubility of zinc oxide in urea, while the zinc oxide increases the solubility of ammonium sulfate in the urea.

Having now generally described the invention, the following examples are presented by way of illustration in order to obtain a better appreciation thereof. Unless otherwise indicated, these examples are for illustration only and are not intended to be limiting in any way.

EXAMPLES

The following formulations were prepared by adding the indicated amount of reagent grade zinc oxide powder to molten urea maintained at 280° to 300°F., with continuous stirring. After a few minutes, all of the zinc oxide had dissolved, and prills were formed from the melt. Several samples were coated with Kaolin clay using conventional techniques. pH was determined potentiometrically using 6% aqueous solutions in distilled water. The prills were tested for moisture absorption by exposing them to a constant relative humidity of 81% and determining moisture content by the Karl Fischer titration method, corrected for the interference of zinc oxide, since zinc oxide gives a positive interference with the Karl Fischer titration. Moisture absorption was tested after 0, 30, and 60 minutes. The following Table summarizes test results obtained on these preparations:

TABLE

| Internal Additive | Coating Agent | pH | MOISTURE CONTENT, PERCENT | | |
|---|---|---|---|---|---|
| | | | Original | 30 min. | 60 min. |
| none | 3% kaolin | 8.3 | 0.27 | 0.60 | 0.92 |
| 1% ZnO | — | 8.0 | 0.20 | 0.84 | 0.99 |
| 3% ZnO | — | 8.7 | 0.20 | 1.95 | 2.46 |
| 5% ZnO | — | 8.7 | 0.27 | 0.86 | 1.47 |
| 5% ZnO | — | — | — | — | — |
| 6% ZnO | 2% kaolin | — | 0.21 | 1.34 | 1.90 |
| 8% ZnO | 2% kaolin | — | 0.24 | 1.59 | 2.15 |
| 10% ZnO | — | — | 0.24 | 1.96 | 2.23 |
| 10% ZnO | 2% kaolin | — | 0.19 | 1.47 | 2.40 |
| 13% ZnO | 2% kaolin | — | 0.24 | 1.40 | 2.50 |
| 15% ZnO | — | — | 0.24 | 1.99 | 2.80 |

In brief summary, the process of the present invention has been found to be extremely useful in preparing urea-zinc oxide compositions. A wide variety of zinc content preparations may be made by this process, and other ingredients, such as trace elements and the like may be added if desired. Accordingly, it will be appreciated that while the foregoing disclosure relates only to preferred embodiments of the invention for preparing urea particles having a fertilizing quantity of available zinc in the form of zinc oxide homogeneously dispersed throughout the urea, numerous modifications and alterations may be made by those skilled in the art without departing from spirit and scope of the invention as set forth in the appended claims.

Accordingly, what is claimed as new and intended to be secured by Letters Patent of the United States is:

1. A particulate fertilizer which comprises a solidified solution of urea particles having a water content of less than 12% and having a fertilizing quantity in an amount of less than 27.5% of ZnO homogeneously dispersed throughout said urea.

2. The particulate fertilizer of claim 1, wherein said zinc oxide is partially complexed with said urea.

3. The particulate fertilizer of claim 1, wherein said zinc oxide is present in an amount of from 1 to 15%.

4. The fertilizing composition of claim 1, wherein said particulate fertilizer is in the form of prills, granules, or crystals.

5. The particulate fertilizer of claim 1, wherein said prills are coated with a conditioner or anti-caking agent.

6. The particulate fertilizer of claim 1 wherein the water content is less than 03% by weight.

7. A process for preparing a particulate fertilizer which comprises homogeneously dissolving a fertilizing quantity of ZnO in an amount of less than 27.5% into molten urea having a water content of less than 12% at a temperature above the melting point of the desired urea-zinc oxide blend, and solidifying the molten urea-zinc oxide into solid particles.

8. The process of claim 7, wherein said molten urea is maintained at a temperature of from 220° to 335°F.

9. The process of claim 7, wherein the water content of said molten urea is reduced to less than 0.3% by weight prior to adding said zinc oxide.

10. The process of claim 9, wherein said molten urea-zinc oxide blend is solidified by prilling, granulating, or crystallizing.

* * * * *